(12) United States Patent
Voglewede et al.

(10) Patent No.: US 9,849,506 B2
(45) Date of Patent: Dec. 26, 2017

(54) INDUCTION INFILTRATION AND COOLING OF MATRIX DRILL BITS

(71) Applicant: Halliburton Energy Services, Inc., Houston, TX (US)

(72) Inventors: Daniel Brendan Voglewede, Spring, TX (US); Seth Garrett Anderle, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 245 days.

(21) Appl. No.: 14/647,562

(22) PCT Filed: Jul. 2, 2014

(86) PCT No.: PCT/US2014/045186
§ 371 (c)(1),
(2) Date: May 27, 2015

(87) PCT Pub. No.: WO2016/003452
PCT Pub. Date: Jan. 7, 2016

(65) Prior Publication Data
US 2016/0001359 A1 Jan. 7, 2016

(51) Int. Cl.
*B22D 23/06* (2006.01)
*B22D 27/04* (2006.01)
(Continued)

(52) U.S. Cl.
CPC ............. *B22D 23/06* (2013.01); *B22C 9/065* (2013.01); *B22D 19/14* (2013.01); *B22D 27/04* (2013.01);
(Continued)

(58) Field of Classification Search
CPC ........ B22D 19/14; B22D 23/06; B22D 25/06; B22D 27/04; B22C 9/065
(Continued)

(56) References Cited

U.S. PATENT DOCUMENTS 1,943,802 A * 1/1934 Northrup ................ F27D 11/00
219/661
4,909,998 A * 3/1990 Nishizawa ............. C30B 11/00
117/223
(Continued)

FOREIGN PATENT DOCUMENTS

WO 2016003452 A1 1/2016

OTHER PUBLICATIONS

International Search Report and Written Opinion for PCT/US2014/045186 dated Mar. 27, 2015.

*Primary Examiner* — Kevin P Kerns
(74) *Attorney, Agent, or Firm* — McDermott Will & Emery LLP (57) ABSTRACT

Zonal heating and cooling during the production of matrix drill bits may be achieved with a system that includes a cavity defined within a mold assembly having a central axis; reinforcing particles and a binder material disposed within the cavity; and a plurality of induction coils about a periphery of the mold assembly, each induction coil being spaced from each other along the height of the mold assembly, wherein a first induction coil of the plurality of induction coils is arranged proximal to a portion of mold assembly containing a portion of the reinforcing particles and a second induction coil of the plurality of induction coils is arranged proximal to a portion of the mold assembly containing a portion of the binder material.

8 Claims, 7 Drawing Sheets

(51) Int. Cl.

| | |
|---|---|
| *B22D 19/14* | (2006.01) |
| *H05B 6/36* | (2006.01) |
| *H05B 6/40* | (2006.01) |
| *E21B 10/42* | (2006.01) |
| *B22C 9/06* | (2006.01) |
| *C22C 1/10* | (2006.01) |
| *C22C 29/08* | (2006.01) |
| *H05B 6/14* | (2006.01) |
| *C22C 26/00* | (2006.01) |
| *C22C 29/06* | (2006.01) |
| *C22C 29/16* | (2006.01) |

(52) U.S. Cl.
CPC ............ *C22C 1/1036* (2013.01); *C22C 29/08* (2013.01); *E21B 10/42* (2013.01); *H05B 6/14* (2013.01); *H05B 6/367* (2013.01); *H05B 6/40* (2013.01); *C22C 26/00* (2013.01); *C22C 29/06* (2013.01); *C22C 29/16* (2013.01); *Y02P 10/253* (2015.11)

(58) Field of Classification Search
USPC .................. 164/4.1, 154.1, 493, 513, 97
See application file for complete search history.

(56) References Cited

U.S. PATENT DOCUMENTS

| | | |
|---|---|---|
| 5,373,907 A | 12/1994 | Weaver |
| 5,524,697 A | 6/1996 | Cook |
| 6,209,420 B1 | 4/2001 | Butcher et al. |
| 6,209,618 B1 * | 4/2001 | Chiang ............... B22D 27/045 164/338.1 |
| 6,220,117 B1 | 4/2001 | Butcher |
| 6,502,624 B1 * | 1/2003 | Williams et al. ...... B22D 23/00 164/113 |
| 6,655,481 B2 | 12/2003 | Findley et al. |
| 2006/0231293 A1 | 10/2006 | Ladi et al. |
| 2011/0114394 A1 | 5/2011 | Lockwood et al. |
| 2013/0156637 A1 | 6/2013 | Park et al. |
| 2016/0001359 A1 | 1/2016 | Voglewede et al. |

* cited by examiner

INDUCTION INFILTRATION AND COOLING OF MATRIX DRILL BITS

BACKGROUND

The present disclosure relates to drill bit fabrication.

A wide variety of tools are used downhole in the oil and gas industry, including tools for forming wellbores, tools used in completing wellbores that have been drilled, and tools used in producing hydrocarbons such as oil and gas from the completed wells. Cutting tools, in particular, are frequently used to drill oil and gas wells, geothermal wells and water wells. Cutting tools may include roller cone drill bits, fixed cutter drill bits, reamers, coring bits, and the like. For example, fixed cutter drill bits are often formed with a matrix bit body having cutting elements or inserts disposed at select locations about the exterior of the matrix bit body. During drilling, these cutting elements engage and remove adjacent portions of the subterranean formation.

Composite materials may be used in a matrix bit body of a fixed-cutter bit. Such materials are generally erosion-resistant and exhibit high impact strength. However, such composite materials can be brittle. As a result, stress cracks can occur because of the thermal stresses experienced during manufacturing or the mechanical stresses conveyed during drilling. This is especially true as erosion of the composite materials accelerates.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure relates to zonal heating and cooling during the production of matrix drill bits. The teachings of this disclosure can be applied to any downhole tool that can be formed at least partially of composite materials described herein that include reinforcing particles dispersed in a binder material. Such tools may include tools for drilling wells, completing wells, and producing hydrocarbons from wells. Examples of such tools include cutting tools, such as drill bits, reamers, stabilizers, and coring bits; drilling tools such as rotary steerable devices and mud motors; and other tools used downhole such as window mills, packers, tool joints, and other wear-prone tools.

Figure 1:
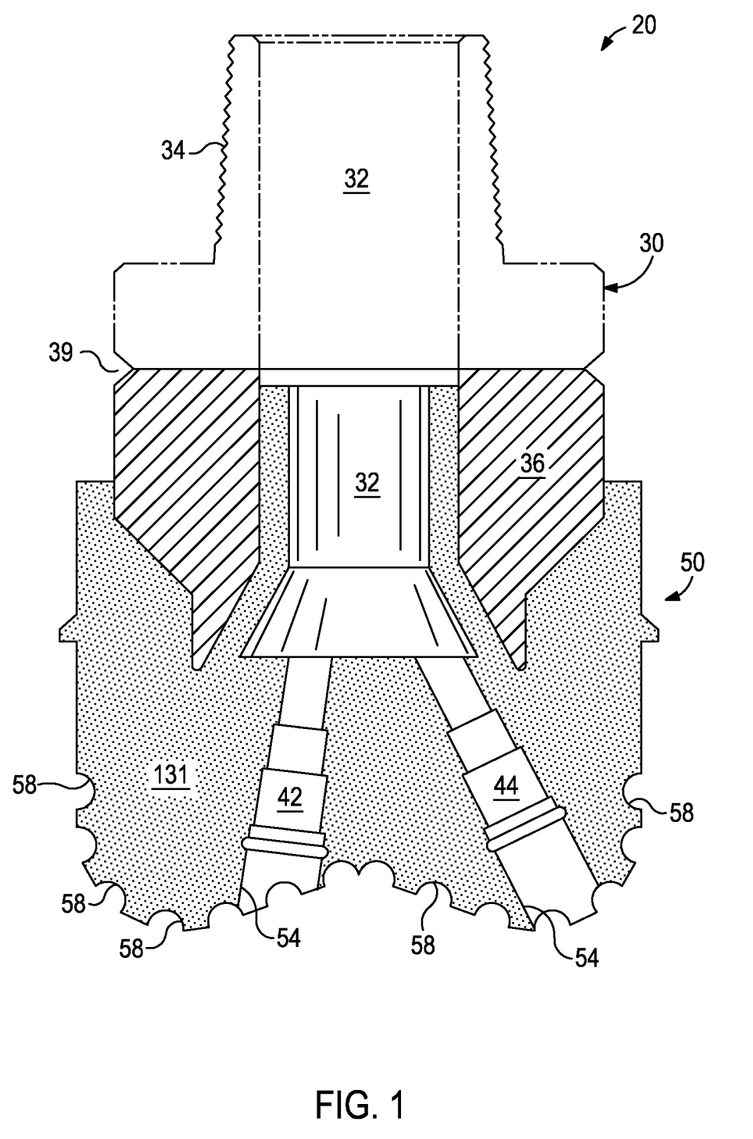
FIG. 1 is a cross-sectional view showing one example of a drill bit having a matrix bit body in accordance with the teachings of the present disclosure.

FIG. 1 is a cross-sectional view showing one example of a matrix drill bit 20 having a matrix bit body 50 formed by a hard composite 131 with reinforcing particles dispersed in a binder material. As used herein, the term "matrix drill bit" is meant to encompass rotary drag bits, drag bits, fixed cutter drill bits, and any other drill bit having a matrix bit body and capable of incorporating the teachings of the present disclosure.

For embodiments such as shown in FIG. 1, the matrix drill bit 20 may include a metal shank 30 with a metal blank 36 securely attached thereto (e.g., at weld location 39). The metal blank 36 extends into the matrix bit body 50. The metal shank 30 comprises a threaded connection 34 distal to the metal blank 36.

The metal shank 30 and metal blank 36 are generally cylindrical structures that at least partially define corresponding fluid cavities 32 that fluidly communicate with each other. The fluid cavity 32 of the metal blank 36 may further extend into the matrix bit body 50. At least one flow passageway (shown as two flow passageways 42 and 44) may extend from the fluid cavity 32 to the exterior portions of the matrix bit body 50. Nozzle openings 54 may be defined at the ends of the flow passageways 42 and 44 at the exterior portions of the matrix bit body 50.

Figure 2:
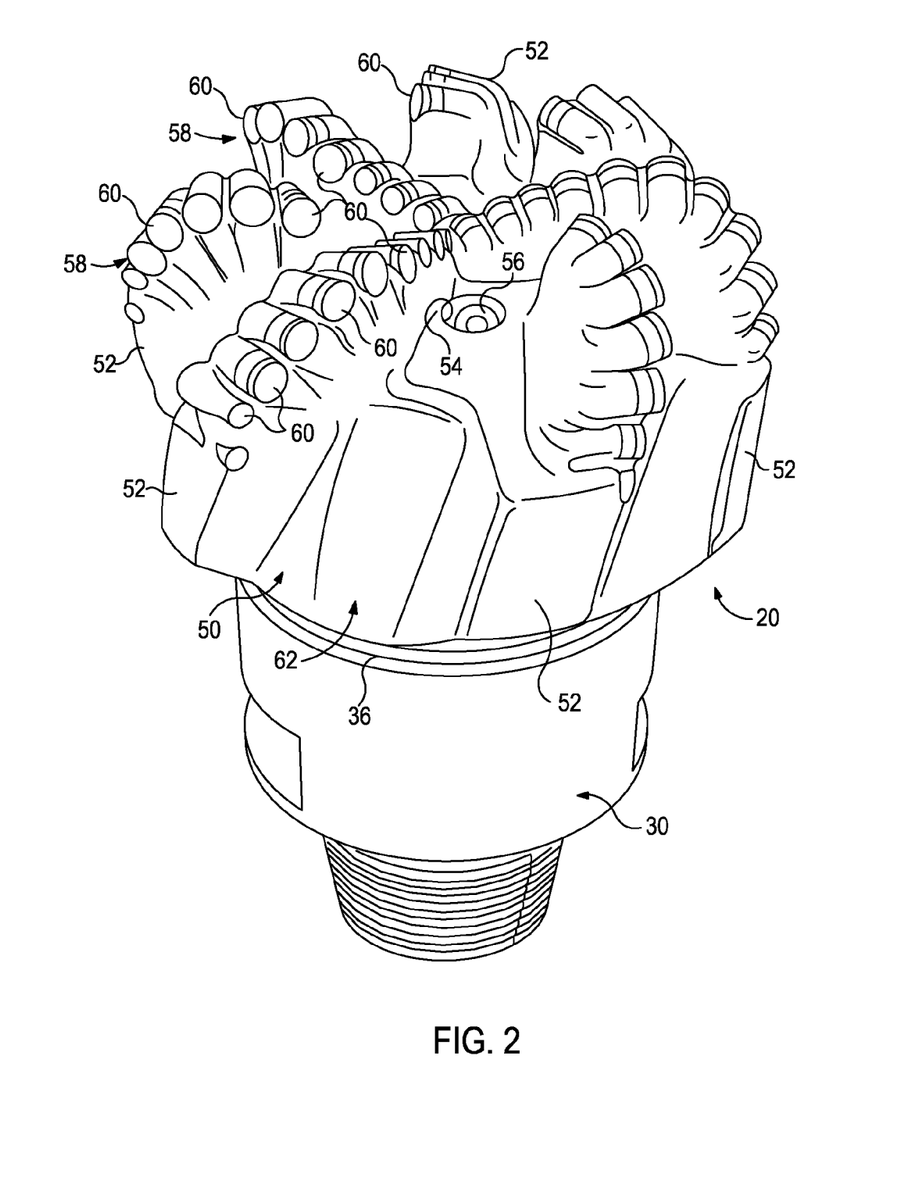
FIG. 2 is an isometric view of the drill bit of FIG. 1.

A plurality of indentations or pockets 58 are formed at the exterior portions of the matrix bit body 50 and are shaped to receive corresponding cutting elements 60 (shown in FIG. 2).

FIG. 2 is an isometric view of the drill bit 20 of FIG. 1 showing one example of a matrix drill bit 20 formed with the matrix bit body 50 in accordance with the teachings of the present disclosure. As illustrated, the matrix drill bit 20 includes the metal blank 36 and the metal shank 30, as generally described above with reference to FIG. 1.

The matrix bit body 50 includes a plurality of cutter blades 52 formed on the exterior of the matrix bit body 50. Cutter blades 52 may be spaced from each other on the exterior of the composite matrix bit body 50 to form fluid flow paths or junk slots 62 therebetween.

As illustrated, the plurality of pockets 58 formed in the cutter blades 52 at selected locations receive corresponding cutting elements 60 (also known as cutting inserts), securely mounted (e.g., via brazing) in positions oriented to engage and remove adjacent portions of a subterranean formation during drilling operations. More particularly, the cutting elements 60 may scrape and gouge formation materials from the bottom and sides of a wellbore during rotation of the matrix drill bit 20 by an attached drill string (not shown). For some applications, various types of polycrystalline diamond compact (PDC) cutters may be used as cutting elements 60. A matrix drill bit having such PDC cutters may sometimes be referred to as a "PDC bit".

A nozzle 56 may be disposed in each nozzle opening 54. For some applications, nozzles 56 may be described or otherwise characterized as "interchangeable" nozzles.

A wide variety of molds may be used to form a composite matrix bit body and associated matrix drill bit in accordance with the teachings of the present disclosure.

Figure 3:
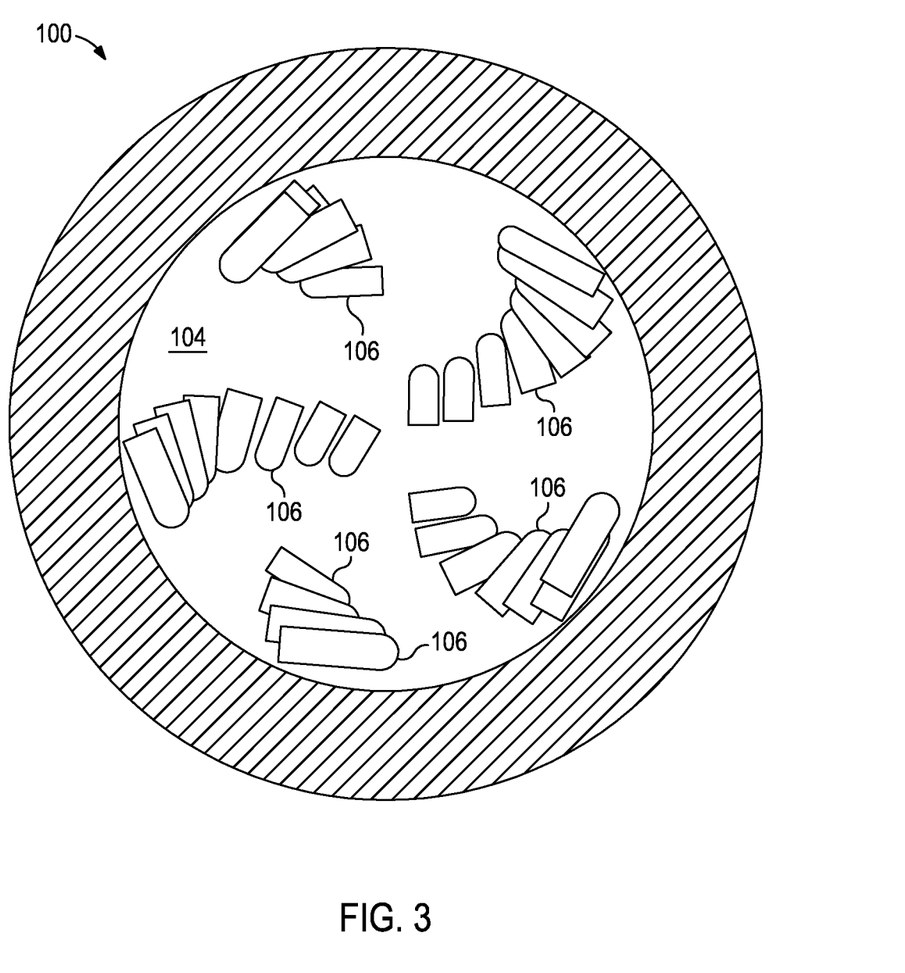
FIG. 3 is an end view showing one example of a mold assembly for use in forming a matrix bit body in accordance with the teachings of the present disclosure.

FIG. 3 is an end view showing one example of a mold assembly 100 for use in forming a matrix bit body incorporating teachings of the present disclosure. A plurality of mold inserts 106 may be placed within a cavity 104 defined by or otherwise provided within the mold assembly 100. The mold inserts 106 may be used to form the respective pockets in blades of the matrix bit body. The location of mold inserts 106 in cavity 104 corresponds with desired locations for installing the cutting elements in the associated blades. Mold inserts 106 may be formed from various types of material such as, but not limited to, consolidated sand and graphite.

Figure 4:
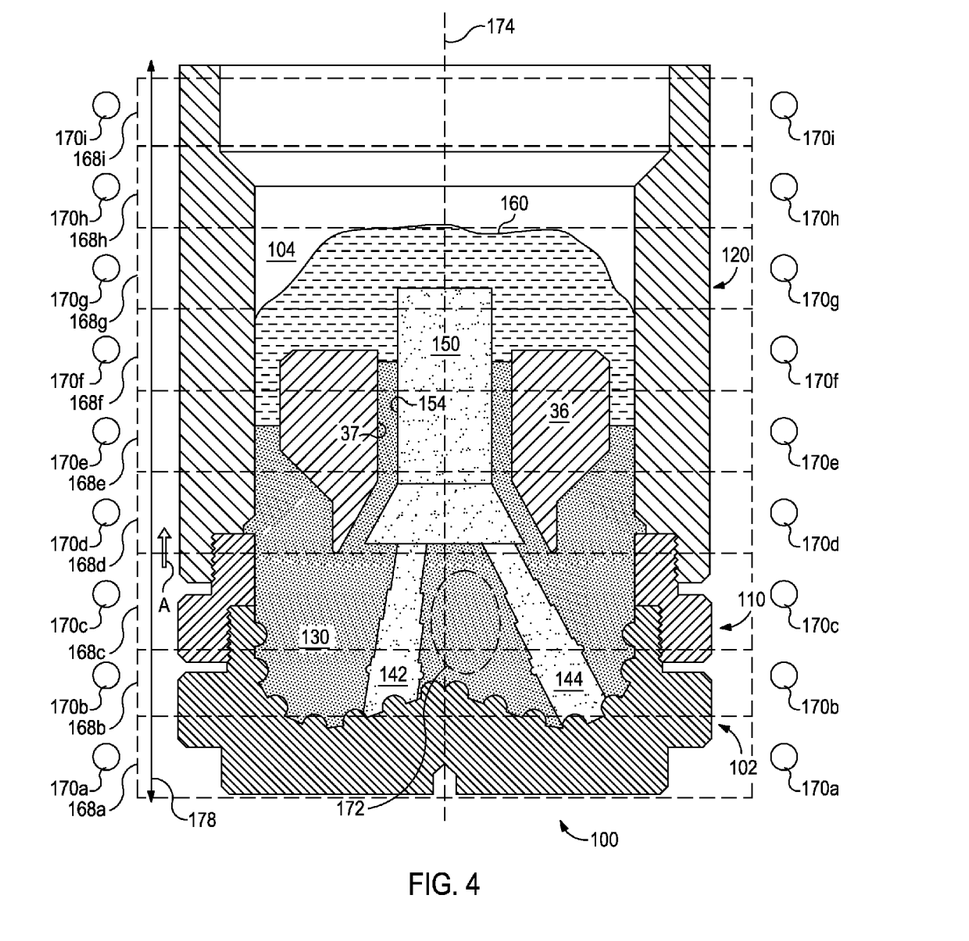
FIG. 4 is a cross-sectional view of induction coils axially offset along an outer portion of the mold assembly of FIG. 3 that may be used in forming a matrix bit body incorporating teachings of the present disclosure.

FIG. 4 is a cross-sectional view of induction coils 170a-i axially offset along an outer portion of the mold assembly 100 of FIG. 3 and that may be used in forming a matrix bit body incorporating teachings of the present disclosure. The mold assembly 100 may include several components such as a mold 102, a gauge ring or connector ring 110, and a funnel 120. Mold 102, gauge ring 110, and funnel 120 may be formed from graphite or other suitable materials known to those skilled in the art. Various techniques may be used to manufacture the mold assembly 100 and components thereof including, but not limited to, machining a graphite blank to produce the mold 102 with the associated cavity 104 having a negative profile or a reverse profile of desired exterior features for a resulting matrix bit body. For example, the cavity 104 may have a negative profile that corresponds with the exterior profile or configuration of the blades 52 and the junk slots 62 formed therebetween, as shown in FIGS. 1-2.

Various types of temporary displacement materials may be installed within mold cavity 104, depending upon the desired configuration of a resulting matrix drill bit. Additional mold inserts (not expressly shown) may be formed from various materials (e.g., consolidated sand and/or graphite) may be disposed within mold cavity 104. Such mold inserts may have configurations corresponding to the desired exterior features of the matrix drill bit (e.g., junk slots).

Displacement materials (e.g., consolidated sand) may be installed within the mold assembly 100 at desired locations to form the desired exterior features of the matrix drill bit (e.g., the fluid cavity and the flow passageways). Such displacement materials may have various configurations. For example, the orientation and configuration of the consolidated sand legs 142 and 144 may be selected to correspond with desired locations and configurations of associated flow passageways and their respective nozzle openings. The consolidated sand legs 142 and 144 may be coupled to threaded receptacles (not expressly shown) for forming the threads of the nozzle openings that couple the respective nozzles thereto.

A relatively large, generally cylindrically-shaped consolidated sand core 150 may be placed on the legs 142 and 144. Core 150 and legs 142 and 144 may be sometimes described as having the shape of a "crow's foot." Core 150 may also be referred to as a "stalk." The number of legs 142 and 144 extending from core 150 will depend upon the desired number of flow passageways and corresponding nozzle openings in a resulting matrix bit body. The legs 142 and 144 and the core 150 may also be formed from graphite or other suitable materials.

After desired displacement materials, including core 150 and legs 142 and 144, have been installed within mold assembly 100, reinforcing particles 130 (sometimes referred to as "reinforcing powder") may then be placed within or otherwise introduced into the mold assembly 100. After a sufficient volume of reinforcing particles 130 has been added to the mold assembly 100, the metal blank 36 may then be placed within mold assembly 100. The metal blank 36 preferably includes an inside diameter 37, which is larger than the outside diameter 154 of sand core 150. Various fixtures (not expressly shown) may be used to position the metal blank 36 within the mold assembly 100 at a desired location. Then, the reinforcing particles 130 may be filled to a desired level within the cavity 104.

Examples of reinforcing particles suitable for use in conjunction with the embodiments described herein may include, but are not limited to, particles or powders of metals, metal alloys, metal carbides (e.g., tungsten carbides, macrocrystalline tungsten carbides, cast tungsten carbides, crushed sintered tungsten carbides, and carburized tungsten carbides), metal nitrides, diamonds, superalloys, and the like, or any combination thereof.

As illustrated, binder material 160 may be placed on top of the reinforcing particles 130, metal blank 36, and core 150. Alternatively, in some embodiments, the binder material 160 may be included with at least a portion of the reinforcing material 130. In some embodiments, the binder material 160 may be covered with a flux layer (not expressly shown). A cover or lid (not expressly shown) may be placed over the mold assembly 100.

The mold assembly 100 and materials disposed therein may then be placed relationally to a series of two or more induction coils 170a-i (illustrated as nine induction coils). More particularly, the mold assembly 100 may be arranged such that the induction coils 170a-i are disposed at the periphery of the mold assembly 100 and separated and/or spaced along a longitudinal height 178 of the mold assembly 100. The mold assembly 100 and materials disposed therein may be heated by increasing the current through the induction coils 170a-i. When the binder material 160 reaches a temperature at or above its melting point, the binder material 160 may liquefy and infiltrate the reinforcing particles 130.

Generally, an alternating current may be applied to the induction coils to produce eddy currents that heat objects placed in the interior of the coil. This heating mechanism is generally more energy efficient and more controllable than traditional resistance element furnaces where temperature is transferred through a combination of convection and conduction. The amount of current applied to the coils may vary based on the thickness of the coil, the length of the coil, the desired temperature for the materials in the interior of the coil, and the like.

Examples of binder materials suitable for use in conjunction with the embodiments described herein may include, but are not limited to, copper, nickel, cobalt, iron, aluminum, molybdenum, chromium, manganese, tin, zinc, lead, silicon, tungsten, boron, phosphorous, gold, silver, palladium, indium, any mixture thereof, any alloy thereof, and any combination thereof. Nonlimiting examples of binder materials may include copper-phosphorus, copper-phosphorous-silver, copper-manganese-phosphorous, copper-nickel, copper-manganese-nickel, copper-manganese-zinc, copper-manganese-nickel-zinc, copper-nickel-indium, copper-tin-manganese-nickel, copper-tin-manganese-nickel-iron, gold-nickel, gold-palladium-nickel, gold-copper-nickel, silver-copper-zinc-nickel, silver-manganese, silver-copper-zinc-cadmium, silver-copper-tin, cobalt-silicon-chromium-nickel-tungsten, cobalt-silicon-chromium-nickel-tungsten-boron, manganese-nickel-cobalt-boron, nickel-silicon-chromium, nickel-chromium-silicon-manganese, nickel-chromium-silicon, nickel-silicon-boron, nickel-silicon-chromium-boron-iron, nickel-phosphorus, nickel-manganese, copper-aluminum, copper-aluminum-nickel, copper-aluminum-nickel-iron, copper-aluminum-nickel-zinc-tin-iron, and the like, and any combination thereof.

Generally, when using traditional resistance element furnaces where temperature is transferred through a combination of convection and conduction, the reinforcing particles 130 takes longer to heat than the binder material 160, especially the reinforcing particles 130 disposed in the central portions 172 of the mold assembly 100 because of its distance from the heat source. Accordingly, during the beginning of the infiltration process with traditional resistance element furnaces, portions of the reinforcing particles 130 may be at a temperature lower than the melting point of the binder material 160. Consequently, the ability of the liquefied binder material 160 to flow through the interstitial spaces of the reinforcing particles 130 may be inhibited by partial solidification on portions of the reinforcing particles 130 that are not sufficiently hot, which may result in the formation of porosity, voids, or oxides in a resultant hard composite and even material segregation of the reinforcing particles 130 and binder material 160. Further, during the infiltration process with traditional resistance element furnaces, as the reinforcing particles 130, legs 142 and 144, and sand core 150 are heated, the binding elements of the sand core 150, impurities, and water are evaporated. If infiltration occurs prior to the reinforcing particles 130 reaching a sufficient temperature to burn off these impurities and vapors, the vapors may become trapped in the system by the liquefied binder material 160 creating the air pockets and voids.

Then, once the mold assembly 100 cools, residual stresses are created at these voids, which may provide failure points that allow for crack formation, crack propagation, and the like in the hard composite during operation downhole or during temperature changes resulting from post-processing (e.g., welding or brazing).

Accordingly, the embodiments present herein use the induction coils 170a-i to control or otherwise regulate the temperature of the materials in the mold assembly 100 in cross-sectional zones 168 a-i, respectively, along the central axis 174 of the mold assembly 100 and along its height 178. The zones 168 a-i are illustrated with boxes in FIG. 4. However, as will be appreciated, the zones may not be as clearly defined and may overlap in some amount.

Induction heating may allow for heating the reinforcing particles 130, including the reinforcing particles 130 in the central portion 172 of the mold assembly 100, to a temperature that mitigates or prevents void formation before infiltrating the reinforcing particles 130 with the binder material 160. In some embodiments, for example, the induction coils 170a-d arranged at or near portions of the mold assembly 100 that contain the reinforcing particles 130 (e.g., proximal to or adjacent the mold 102 and gauge ring 110) may be operated at a current that heats the reinforcing particles 130 in zones 168a-d to a higher temperature than the reinforcing particles 130 in zones 168 e-g corresponding to induction coils 170e-g arranged at or near portions of the mold assembly 100 that contain the binder material 160.

In some embodiments, the zonal heating may be used to heat portions of the reinforcing particles 130 before heating the binder material 160 to a temperature sufficient for infiltration. For example, in some instances, the current to each of the induction coils 170a-i may be increased sequentially in a longitudinal direction A along the height 178 of the mold assembly 100 so as to heat the reinforcing particles 130 in the same direction. More particularly, the current to each of the induction coils 170a-i may be increased sequentially upward, from the mold 102 and past the binder material 160 (e.g., in order of induction coils 170a, 170b, 170c, 170d, 170e, 170f, 170g, 170h, and 170i). In another example, the mold assembly 100 may be first preheated where the current to all of the induction coils 170a-i may be such that the reinforcing particles 130 and binder material 160 are heated to a temperature below the melting point of the binder material 160. Then, the current to individual induction coils 170a-i may be independently adjusted to heat the reinforcing particles 130 in corresponding zones 168a-i to higher temperatures in a desired sequence to cause infiltration of the reinforcing particles 130 with the binder material 160. Once at infiltration temperatures, the current to the induction coils 170a-d proximal to the mold 102 and gauge ring 110 may be at a higher temperature than the induction coils 170e-i proximal to the interface between the binder material 160 and the reinforcing particles 130.

According to the present disclosure, the thermal profile of the mold assembly 100 in zones 168a-i along the longitudinal direction A may be selectively controlled by varying the current applied to the induction coils 170a-i. As will be appreciated, this may advantageously mitigate or prevent the formation of voids within the interstitial spaces of the reinforcing particles 130 during the infiltration process.

Figure 5:
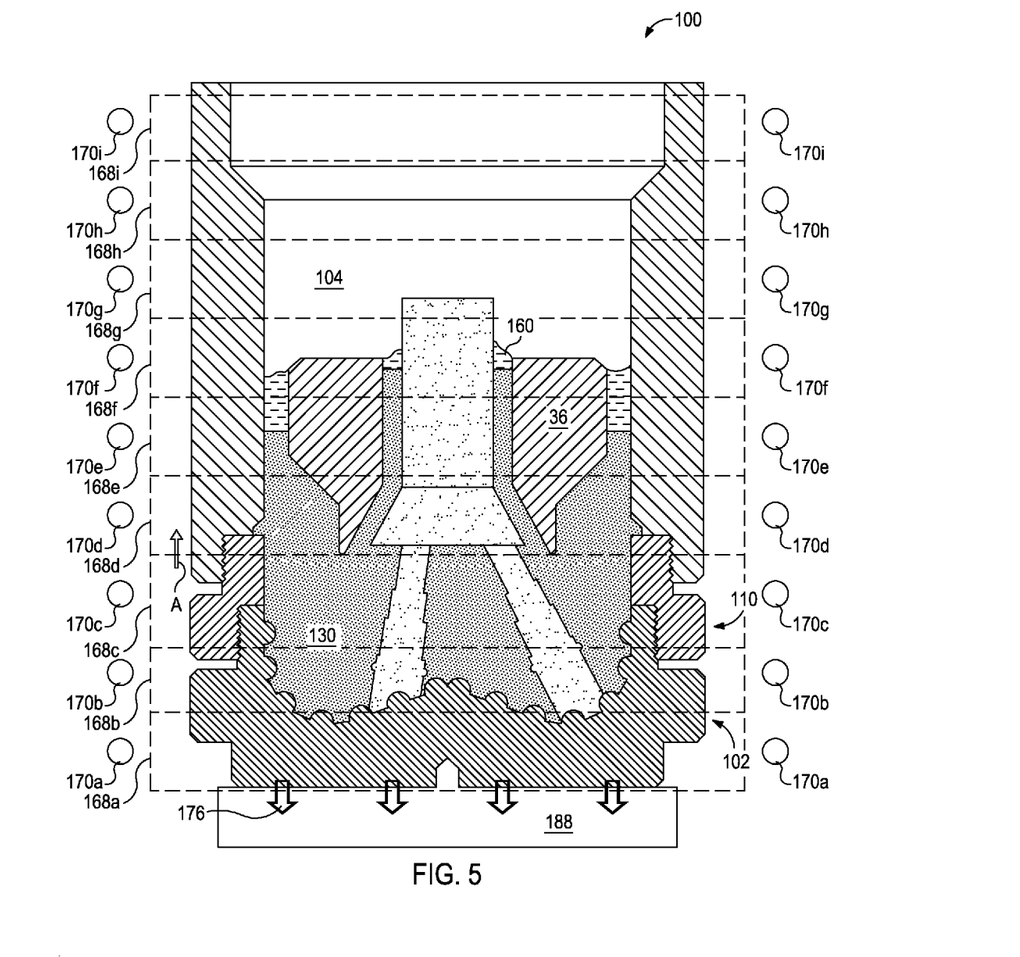
FIG. 5 is a cross-sectional view of the mold assembly of FIGS. 3 and 4 and induction coils after infiltration.

FIG. 5 is a cross-sectional view of the mold assembly 100 of FIGS. 3 and 4 and induction coils 170a-i following infiltration. After a predetermined amount of time allotted for the liquefied binder material 160 to infiltrate the reinforcing particles 130, the mold assembly 100 may then be cooled. In some cases, for example, the mold assembly 100 may be in contact with a thermal heat sink 188, which draws thermal energy 176 out of the mold assembly 100 from the bottom. In the illustrated embodiment, the thermal heat sink 188 is a quenching table. In other embodiments, the thermal heat sink 188 may be a cooling plate designed to circulate a fluid (e.g., water) at a reduced temperature to draw thermal energy from the mold assembly 100 and into the circulating fluid, and thereby reduce the temperature of the mold assembly 100. In other embodiments, however, the thermal heat sink 188 may be any type of cooling device or heat exchanger configured to encourage heat transfer 176 from the bottom of the mold assembly 100 to the thermal heat sink 188.

During cooling, heat may be lost through the sides of the mold assembly 100 through radiation and/or convection, which causes uneven cooling of the liquefied binder material 160 infiltrated within the reinforcing particles 130. Fast or uneven cooling of the liquefied binder 160 may generate currents within the liquefied binder that can cause the reinforcing particles 130 to shift, such that when cooled, the hard composite may have portions that are substantially binder material 160, which is soft and less wear resistant in comparison to the reinforcing particles 130. Additionally, during cooling, the voids produced during infiltration may be trapped if the binder material 160 above the voids solidifies before backfilling the voids. The voids and the softer portions of the hard composite having reduced concentrations of reinforcing particles 130 may be failure points that allow for crack initiation and/or propagation.

According to the present disclosure, the thermal profile of the mold assembly 100 in zones 168a-i may be selectively controlled by varying the current applied to the induction coils 170a-i during cooling, and thereby grading the rate of thermal energy loss in the longitudinal direction A. As will be appreciated, this may advantageously optimize the directional solidification of the molten contents within the mold assembly 100, thereby effectively pushing or urging any potential defects (e.g., voids) toward the top regions of the mold assembly 100 where they can be machined off later during finishing operations.

The induction coils 170a-i may be independently controlled or operated to regulate heat loss through the sides of the mold assembly 100. For example, as the thermal energy 176 is drawn out of the bottom of the mold assembly 100, the temperature of the reinforcing particles 130 in zones 168a-b proximal to the mold 102 may be lower than the temperature of the reinforcing particles 130 in zones 168c-i proximal to the gauge ring 110, the metal blank 36, and the top of the mold assembly 100. In some embodiments, the temperature of the reinforcing particles 130 in zone 168a may be decreased to at least 10° C. less than the melting point of the binder material 160, the temperature of the reinforcing particles 130 in zone 168b may be at least 5° C. less than the melting point of the binder material 160, and the temperature of the reinforcing particles 130 in zone 168c-i may be at or above the melting point of the binder material 160. As the mold assembly 100 and materials contained therein cool, the current supplied to the induction coils 170a-i may be gradually decreased to provide for directional cooling of the mold assembly 100 and, therefore, directional solidification of the material contained therein. In some embodiments, for example, the temperature of the reinforcing particles 130 in zone 168a may be 50° C. less than the melting point of the binder material 160, the temperature of the reinforcing particles 130 in zone 168b may be 40° C. less than the melting point of the binder material 160, the temperature of the reinforcing particles 130 in zone 168c may be 30° C. less than the melting point of the binder material 160, the temperature of the reinforcing particles 130 in zone 168d may be 20° C. less than the melting point of the binder material 160, the temperature of the reinforcing particles 130 in zone 168e may be 10° C. less than the melting point of the binder material 160, and the temperature of the reinforcing particles 130 in remaining zones 168f-i may be at or above the melting point of the binder material 160.

Once cooled, the mold assembly 100 may be broken away to expose the matrix bit body that comprises the hard composite portion. Subsequent processing and/or finishing according to well-known techniques may be used to produce a matrix drill bit (e.g., as illustrated in FIGS. 1 and 2).

Figure 6:
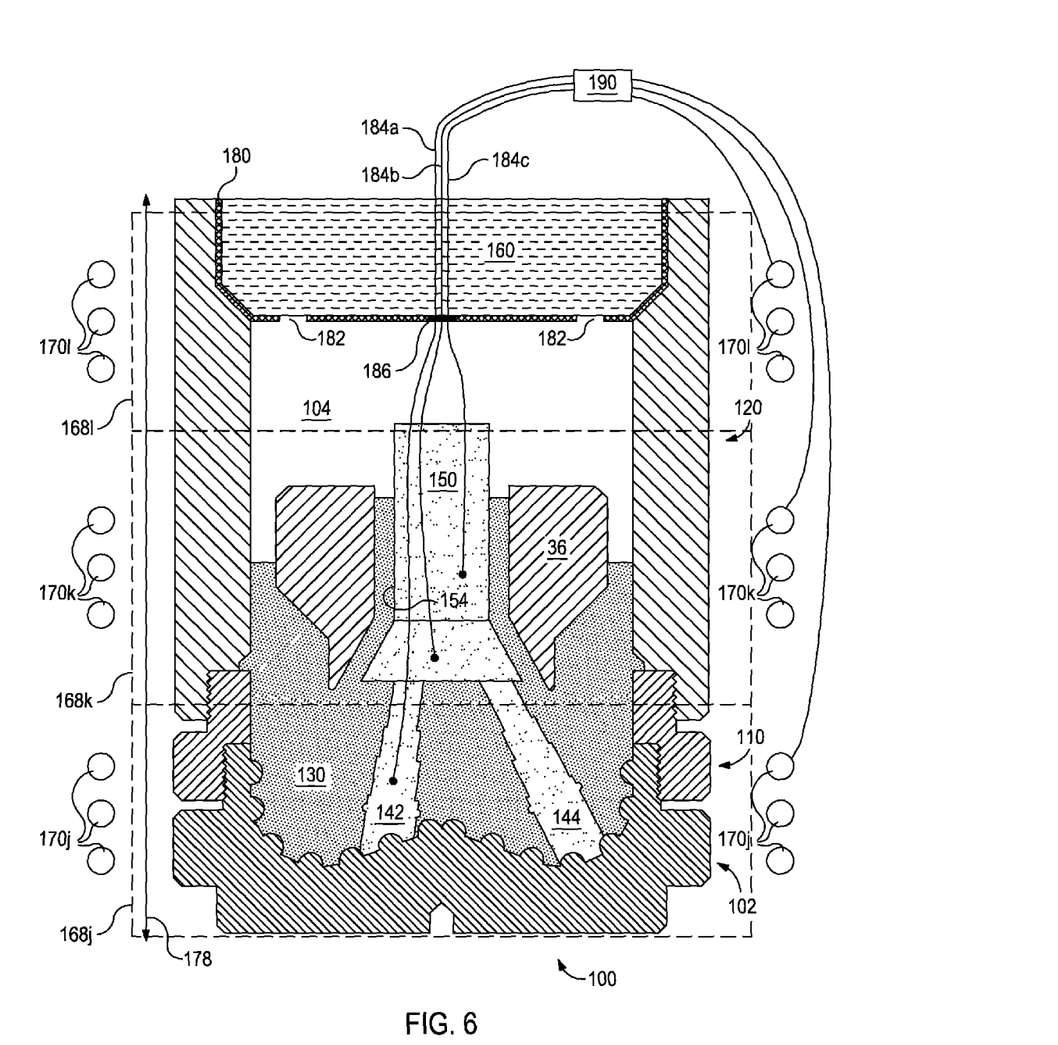
FIG. 6 is a cross-sectional view of induction coils axially offset along an outer portion of the mold assembly that may be used in forming a matrix bit body incorporating teachings of the present disclosure.

FIG. 6 is a cross-sectional view of induction coils 170j-1 axially spaced along the height 178 of the mold assembly 100 that may be used in forming a matrix bit body incorporating teachings of the present disclosure. The mold assembly 100 depicted in FIG. 6 may further include a binder bowl 180. The binder bowl 180 is configured to hold the binder material 160 in the solid form and allow for the liquefied binder material 160 to pass through ports 182 defined in the binder bowl 180. In some instances, a screen or mesh (not illustrated) may be arranged in ports 182 or in lieu of ports 182 to contain the solid binder material 160 in the binder bowl 180.

The induction coils 170j-1 each wrap about the mold assembly 100 three times and allow for controlling the temperature of different portions of the mold assembly 100. As will be appreciated, each induction coil 170j-1 may be wrapped about the periphery of the mold assembly 100 more or less than three times, without departing from the scope of the disclosure. As illustrated, the first induction coil 170j is arranged proximal to or adjacent the mold 102 and gauge ring 110 for heating or cooling the reinforcing particles 130 proximal thereto in zone 168j. The second induction coil 170k is arranged proximal to or adjacent the metal blank for heating or cooling the reinforcing particles 130 proximal thereto in zone 168k, and the third induction coil 170l is arranged proximal to or adjacent the binder bowl 180 for heating or cooling the binder material 160 therein in zone 168l. Such a configuration, or one similar thereto, may allow for heating the reinforcing particles 130 before melting the binder material 160.

Further, one or more thermocouples 184a-c may be positioned within the legs 142 and 144 and the sand core 150 and used to monitor the temperature of the infiltration and cooling processes. As illustrated, thermocouples 184a-c extend up through a plug 186 arranged in the binder bowl 180. However, other configurations may be suitable. For example, one or more open passageways (not shown) may be included in the binder bowl 180 for the thermocouples 184a-c to pass through. Further, thermocouples 184a-c may be used in embodiments where binder bowls are not included (e.g., FIGS. 4-5).

The thermocouples 184a-c and induction coils 170j-1 may be communicably coupled to a control system 190 that allows for monitoring the temperature of the thermocouples 184a-c in real-time and adjusting the current applied to the induction coils 170a-c (relative to heating for infiltration or cooling for solidification) based on the temperatures obtained by the thermocouples 184a-c. In some embodiments, the control system 190 may be automated. In other embodiments, various operations of the control system 190 (e.g., temperature adjustment) may be manually controlled, without departing from the scope of the disclosure.

In some embodiments, automation of the control system 190 may be implemented using computer hardware, software, combinations thereof, and the like. To illustrate this interchangeability of hardware and software, various illustrative blocks, modules, elements, components, methods and algorithms have been described generally in terms of their functionality. Whether such functionality is implemented as hardware or software will depend upon the particular application and any imposed design constraints. For at least this reason, it is to be recognized that one of ordinary skill in the art can implement the described functionality in a variety of ways for a particular application.

Computer hardware used to automate the control system 190 can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

In some embodiments, the data collected using the thermocouples 184a-c, along with post-fabrication analysis of the hard composite, may be archived relative to the fabrication procedure. Evaluation of the fabrication process may then be assessed and improved for future fabrications.

Figure 7:
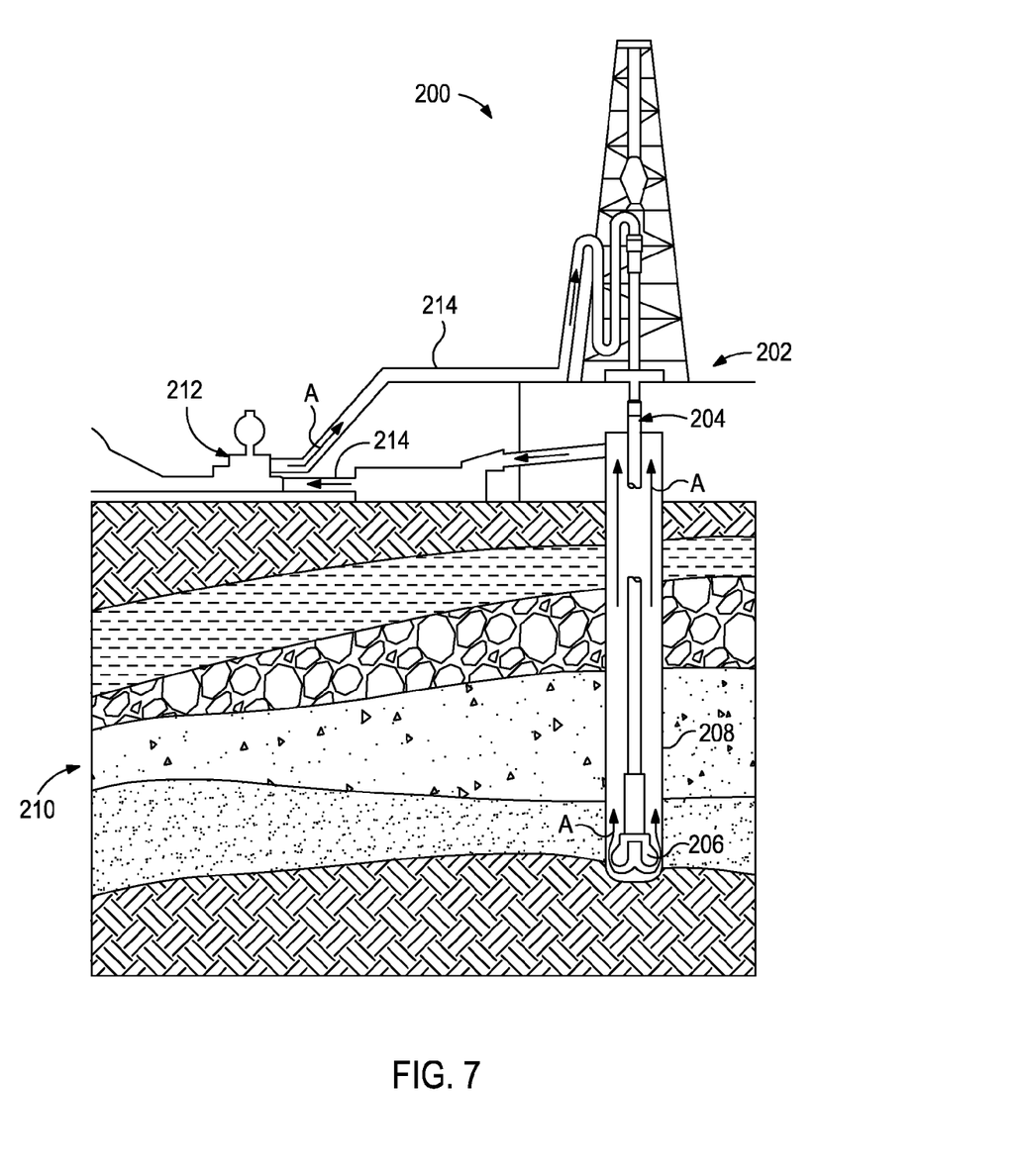
FIG. 7 is a schematic drawing showing one example of a drilling assembly suitable for use in conjunction with the matrix drill bits of the present disclosure.

FIG. 7 is a schematic showing one example of a drilling assembly 200 suitable for use in conjunction with the matrix drill bits that may be fabricated in accordance with the present disclosure. It should be noted that while FIG. 7 generally depicts a land-based drilling assembly, those skilled in the art will readily recognize that the principles described herein are equally applicable to subsea drilling operations that employ floating or sea-based platforms and rigs, without departing from the scope of the disclosure.

The drilling assembly 200 includes a drilling platform 202 coupled to a drill string 204. The drill string 204 may include, but is not limited to, drill pipe and coiled tubing, as generally known to those skilled in the art. A matrix drill bit 206 fabricated according to the embodiments described herein is attached to the distal end of the drill string 204 and is driven either by a downhole motor and/or via rotation of the drill string 204 from the well surface. As the drill bit 206 rotates, it creates a wellbore 208 that penetrates the subterranean formation 210. The drilling assembly 200 also includes a pump 212 that circulates a drilling fluid through the drill string (illustrated as flow arrows A) and other pipes 214.

One skilled in the art would recognize the other equipment suitable for use in conjunction with drilling assembly 200, which may include, but are not limited to, retention pits, mixers, shakers (e.g., shale shaker), centrifuges, hydrocyclones, separators (including magnetic and electrical separators), desilters, desanders, filters (e.g., diatomaceous earth filters), heat exchangers, and any fluid reclamation equipment. Further, the drilling assembly may include one or more sensors, gauges, pumps, compressors, and the like.

Some embodiments may involve implementing a matrix drill bit described herein in a drilling operation. For example, some embodiments may further involve drilling a portion of a wellbore with a matrix drill bit.

Embodiments disclosed herein include Embodiment A, Embodiment B, and Embodiment C.

Embodiment A

A method that includes placing reinforcing particles in a cavity defined within a mold assembly having a height; placing a binder material in the mold assembly; arranging a plurality of induction coils about a periphery of the mold assembly, the plurality of induction coils being spaced from each other along the height of the mold assembly; heating a first portion of the reinforcing particles with a first induction coil of the plurality of induction coils to a temperature greater than a melting point of the binder material, the first portion of the reinforcing particles being disposed in a first cross-sectional zone of the mold assembly adjacent the first induction coil; heating a portion of the binder material with a second induction coil of the plurality of induction coils to a temperature greater than a melting point of the binder material, the portion of the binder material being disposed in a second cross-sectional zone of the mold assembly adjacent the second induction coil; and infiltrating the reinforcing particles with the liquefied binder material.

Embodiment A may have one or more of the following additional elements in any combination: Element A1: the method further including heating a second portion of the reinforcing particles disposed in a third cross-sectional zone of the mold assembly defined by proximity to a third induction coil interposing the first and second induction coils to the temperature greater than the melting point of the binder material by applying a current to the third induction coil; Element A2: the method further including individually applying current to each of the plurality of induction coils to maintain the reinforcing particles at the temperature greater than the melting point of the binder material; Element A3: the method further including after infiltrating, reducing a current applied to the first induction coil to cool the first portion of the reinforcing particles to below the melting point of the binder material; Element A4: the method further including monitoring a temperature of the first portion of the reinforcing particles; and Element A5: wherein the mold assembly includes a binder bowl disposed above the reinforcing particles, the method further including placing the binder material in the binder bowl.

By way of non-limiting example, exemplary combinations applicable to Embodiment A include: Element A1 in combination with Element A2 and optionally Element A5; Element A1 in combination with Element A3 and optionally Element A5; Element A1 in combination with Element A4 and optionally Element A5; Element A2 in combination with Element A3 and optionally Element A5; Element A2 in combination with Element A4 and optionally Element A5; Element A3 in combination with Element A4 and optionally Element A5; at least one of Elements A1-A4 in combination with Element A5; and at least two of Elements A1-A4 in combination.

Embodiment B

A method that includes placing reinforcing particles in a cavity defined within a mold assembly having a height; placing a binder material in the mold assembly; arranging a plurality of induction coils about a periphery of the mold assembly, each induction coil being spaced from each other along the height of the mold assembly, wherein a first induction coil of the plurality of induction coils is arranged proximal to a portion of the mold assembly containing a first portion of the reinforcing particles, a second induction coil of the plurality of induction coils is arranged proximal to a portion of the mold assembly containing a portion of the binder material, and a third induction coil of the plurality of induction coils interposes the first and second induction coils; applying current to the plurality of induction coils; liquefying the binder material; infiltrating the reinforcing particles with the liquefied binder material; reducing the current applied to the first induction coil to cool the first portion of the reinforcing particles to a temperature below a melting point of the binder material; and maintaining the current applied to the third induction coil to maintain a second portion of the reinforcing particles at a temperature above the melting point of the binder material, the second portion of the reinforcing particles being disposed in a second cross-sectional zone of the mold assembly defined by proximity to the third induction coil. Optionally, the method may further include monitoring a temperature of the reinforcing particles.

Embodiment C

A system that includes a cavity defined within a mold assembly having a central axis; reinforcing particles and binder material disposed within the cavity; and a plurality of induction coils about a periphery of the mold assembly, each induction coil being spaced from each other along the height of the mold assembly, wherein a first induction coil of the plurality of induction coils is arranged proximal to a portion of mold assembly containing a portion of the reinforcing particles and a second induction coil of the plurality of induction coils is arranged proximal to a portion of the mold assembly containing a portion of the binder material.

Embodiment C may have one or more of the following additional elements in any combination: Element C1: the system further including a third induction coil interposing the first and second induction coils; Element C2: wherein each of the induction coils wraps about the periphery of the mold assembly at least two times; Element C3: the system further including a core disposed within the cavity that extends at least partially into the reinforcing particles; a metal blank disposed about the core and supported at least partially by the reinforcing particles such that the metal blank extends above the reinforcing particles; and at least one thermocouple disposed in a portion of the core; Element C4: the system of Element C4 further including a control system coupled to the at least one thermocouple and the plurality of induction coils; Element C5: the system further including a binder bowl coupled to the mold assembly and containing the binder material; and Element C6: the system further including a thermal heat sink contacting an end of the mold assembly proximal to the first induction coil and distal to the second induction coil.

By way of non-limiting example, exemplary combinations applicable to Embodiment C include: Element C1 in combination with Element C2 and optionally Element C5, Element C6, or both; Element C1 in combination with Element C3 and optionally Element C5, Element C6, or both; Element C1 in combination with Element C4 and optionally Element C5, Element C6, or both; Element C2 in combination with Element C3 and optionally Element C5, Element C6, or both; Element C2 in combination with Element C4 and optionally Element C5, Element C6, or both; Element C3 in combination with Element C4 and optionally Element C5, Element C6, or both; at least one of Elements C1-C4 in combination with Element C5, Element C6, or both; and at least two of Elements C1-C4 in combination.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
placing reinforcing particles in a cavity defined within a mold assembly having a height;
placing a binder material in the mold assembly;
arranging a plurality of induction coils about a periphery of the mold assembly, the plurality of induction coils being spaced from each other along the height of the mold assembly;
heating a first portion of the reinforcing particles with a first induction coil of the plurality of induction coils to a temperature greater than a melting point of the binder material, the first portion of the reinforcing particles being disposed in a first cross-sectional zone of the mold assembly adjacent the first induction coil;
heating a portion of the binder material with a second induction coil of the plurality of induction coils to a temperature greater than a melting point of the binder material, the portion of the binder material being disposed in a second cross-sectional zone of the mold assembly adjacent the second induction coil;
liquefying the binder material; and infiltrating the reinforcing particles with the liquefied binder material after heating the first portion of the reinforcing particles to the temperature greater than the melting point of the binder material.

2. The method of claim 1 further comprising:
heating a second portion of the reinforcing particles with a third induction coil of the plurality of induction coils to the temperature greater than the melting point of the binder material, the second portion of the reinforcing particles being disposed in a third cross-sectional zone of the mold assembly adjacent the third induction coil, wherein the third induction coil interposes the first and second induction coils.

3. The method of claim 1 further comprising:
individually applying current to each of the plurality of induction coils to maintain the reinforcing particles at the temperature greater than the melting point of the binder material.

4. The method of claim 1 further comprising:
after infiltrating, reducing a current applied to the first induction coil to cool the first portion of the reinforcing particles to below the melting point of the binder material.

5. The method of claim 1 further comprising:
monitoring a temperature of the first portion of the reinforcing particles.

6. The method of claim 1, wherein the mold assembly includes a binder bowl disposed above the reinforcing particles, the method further comprising:
placing the binder material in the binder bowl.

7. A method comprising:
placing reinforcing particles in a cavity defined within a mold assembly having a height;
placing a binder material in the mold assembly;
arranging a plurality of induction coils about a periphery of the mold assembly, each induction coil being spaced from each other along the height of the mold assembly, wherein a first induction coil of the plurality of induction coils is arranged proximal to a portion of the mold assembly containing a first portion of the reinforcing particles, a second induction coil of the plurality of induction coils is arranged proximal to a portion of the mold assembly containing a portion of the binder material, and a third induction coil of the plurality of induction coils interposes the first and second induction coils;
applying current to the plurality of induction coils;
liquefying the binder material;
infiltrating the reinforcing particles with the liquefied binder material after heating the first portion of the reinforcing particles to a temperature greater than a melting point of the binder material;
reducing the current applied to the first induction coil to cool the first portion of the reinforcing particles to a temperature below the melting point of the binder material; and
maintaining the current applied to the third induction coil to maintain a second portion of the reinforcing particles at a temperature above the melting point of the binder material, the second portion of the reinforcing particles being disposed in a second cross-sectional zone of the mold assembly defined by proximity to the third induction coil.

8. The method of claim 7 further comprising:
monitoring a temperature of the reinforcing particles.

* * * * *